United States Patent
Shany et al.

(10) Patent No.: US 8,874,025 B2
(45) Date of Patent: Oct. 28, 2014

(54) TIME-VARYING PHY-LEVEL WIRELESS SECURITY

(75) Inventors: Yaron Shany, Kfar Saba (IL); Nir Shapira, Ra'anana (IL)

(73) Assignee: Celeno Communications (Israel) Ltd., Ra anana (IL)

( * ) Notice: Subject to any disclaimer, the term of this patent is extended or adjusted under 35 U.S.C. 154(b) by 355 days.

(21) Appl. No.: 13/400,153

(22) Filed: Feb. 20, 2012

(65) Prior Publication Data

US 2012/0214403 A1 Aug. 23, 2012

Related U.S. Application Data

(60) Provisional application No. 61/445,276, filed on Feb. 22, 2011, provisional application No. 61/487,355, filed on May 18, 2011.

(51) Int. Cl.
H04K 3/00 (2006.01)

(52) U.S. Cl.
CPC ............ *H04K 3/43* (2013.01); *H04K 3/827* (2013.01); *H04K 3/45* (2013.01); *H04K 2203/34* (2013.01); *H04K 3/825* (2013.01); *H04K 2203/32* (2013.01)
USPC .......... 455/1; 455/41.1; 455/41.2; 455/410; 455/411; 455/414.1

(58) Field of Classification Search
CPC ...................................... H04K 3/827
USPC ............... 455/1, 410, 411, 41.2, 41.1, 414.1
See application file for complete search history.

(56) References Cited

U.S. PATENT DOCUMENTS

| | | | |
|---|---|---|---|
| 6,272,640 B1 | 8/2001 | Sokol | |
| 6,446,049 B1 * | 9/2002 | Janning et al. | 705/40 |
| 7,076,009 B2 | 7/2006 | Wieck | |
| 7,327,794 B2 | 2/2008 | Fanson et al. | |
| 7,672,400 B2 | 3/2010 | Shapira et al. | |
| 7,751,353 B2 | 7/2010 | Shapira et al. | |
| 8,244,169 B1 * | 8/2012 | DiMartino et al. | 455/1 |
| 2009/0097531 A1 * | 4/2009 | Franceschini et al. | 375/133 |
| 2009/0310572 A1 * | 12/2009 | Wang et al. | 370/336 |

OTHER PUBLICATIONS

International Application PCT/IB2012/050714 Search Report dated Sep. 18, 2012 (pp. 1-11).
Gollakota et al., "iJam: Jamming Oneself for Secure Wireless Communication", MIT CSAIL, pp. 1-13, Jun. 7, 2010.
Borisov et al., "Intercepting Mobile Communications: The Insecurity of 802.11", Proceedings of the 7th Annual International Conference on Mobile Computing and Networking, pp. 180-189, Rome, Italy, Jul. 16-21, 2001.

(Continued)

*Primary Examiner* — Sanh Phu
(74) *Attorney, Agent, or Firm* — D. Kligler I.P. Services Ltd.

(57) ABSTRACT

A method for communication includes generating a data transmission including multiple successive parts in respective time intervals, for transmission to a target receiver. At least one jamming transmission is generated, having a configuration that varies over the respective time intervals corresponding to the parts of the data transmission, including at least first and second different configurations generated during respective first and second time intervals. The data transmission is transmitted to the target receiver using an antenna array, and the at least one jamming transmission is transmitted simultaneously using the antenna array.

16 Claims, 4 Drawing Sheets

(56) References Cited

OTHER PUBLICATIONS

Debbah et al., "Wireless physical layer security", EURASIP Journal on Wireless Communications and Networking, vol. 2009, article ID 404061, Dec. 31, 2009.

Tsai et al., "Effective-SNR Mapping for Modeling Frame Error Rates in Multiple-State Channels," 3GPP2, Apr. 29, 2003.

Kant et al. "Fast Link Adaptation for IEEE 802.11n", Master's thesis, The Faculty of Engineering and Science, Aalborg University, Aug. 2007.

Goel et al., "Guaranteeing Secrecy using Artificial Noise," IEEE Transactions on Wireless Communications, vol. 7, issue 6, pp. 2180-2189, Jun. 2008.

Swindelhurst, A.L., "Fixed SINR Solutions for the MIMO Wiretap Channel," Proceedings of the International Conference on Acoustics, Speech and Signal Processing, pp. 2437-2440, Taipei, Taiwan, Apr. 2009.

IEEE Standard 802.11n, "IEEE Standard for Information Technology—Telecommunications and Information Exchange between Systems—Local and Metropolitan Area Networks—Specific Requirements; Part 11: Wireless LAN Medium Access Control (MAC) and Physical Layer (PHY) Specifications; Amendment 5: Enhancements for Higher Throughput", Oct. 29, 2009.

U.S. Appl. No. 13/400,148, filed Feb. 20, 2012.

IEEE P802.11ac™/D1.4, "Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6 GHz", Nov. 2011.

U.S. Appl. No. 13/400,158, filed Feb. 20, 2012.

U.S. Appl. No. 13/400,158 Office Action dated Jul. 18, 2014.

U.S. Appl. No. 13/400,148 Office Action dated Jul. 8, 2014.

\* cited by examiner

US 8,874,025 B2

TIME-VARYING PHY-LEVEL WIRELESS SECURITY

CROSS-REFERENCE TO RELATED APPLICATIONS

This application claims the benefit of U.S. Provisional Patent Application 61/445,276, filed Feb. 22, 2011, and U.S. Provisional Patent Application 61/487,355, filed May 18, 2011, whose disclosures are incorporated herein by reference. This application is related to a U.S. patent application entitled "PHY-Level Wireless Security" (Ser. No. 13/400, 148) and to a U.S. patent application entitled "Multi-Mode PHY-Level Wireless Security" (Ser. No. 13/400,158), filed on even date, whose disclosures are incorporated herein by reference.

FIELD OF THE INVENTION

The present invention relates generally to communication systems, and particularly to methods and systems for securing wireless communication.

BACKGROUND OF THE INVENTION

Some wireless communication systems apply physical-layer (PHY) mechanisms for securing transmissions from illegitimate eavesdropping. For example, U.S. Pat. No. 7,672, 400, whose disclosure is incorporated herein by reference, describes a method for secure communication in a wireless network using a spatial division multiple access transmission scheme. The method includes allocating transmission power to N channels to be transmitted to one or more destination stations by N antennas, such that the power to be received by each one of the one or more destination stations is not greater by more than a predefined power margin than a minimum power required for reception at a desired quality of service.

As another example, U.S. Pat. No. 7,751,353, whose disclosure is incorporated herein by reference, describes a method for securing a wireless transmission. The method includes transmitting a noise transmission to be received by one or more destinations other than an intended destination of a packet during a time period corresponding to the duration of the packet.

Additional examples of secure transmission schemes are described by Goel and Negi, in "Guaranteeing Secrecy using Artificial Noise," IEEE Transactions on Wireless Communications, volume 7, no. 6, June, 2008, pages 2180-2189; and by Swindlehurst, in "Fixed SINR Solutions for the MIMO Wiretap Channel," Proceedings of the International Conference on Acoustics, Speech and Signal Processing, Taipei, Taiwan, April, 2009, pages 2437-2440, which are incorporated herein by reference.

SUMMARY OF THE INVENTION

A method for communication includes generating one or more data streams for transmission to respective target receivers, and one or more jamming streams. At least one parameter, selected from a group of parameters consisting of power ratios for allocation to the jamming streams and Modulation and Coding Schemes (MCSs) for assigning to the data streams, is calculated based on a criterion that is set to reduce a probability of the data streams being decoded by at least one eavesdropping receiver. The data streams and the jamming streams are transmitted using an antenna array while applying the at least one parameter.

In some embodiments, calculating the at least one parameter includes restricting selection of an MCS for a given data stream to a partial subset of the MCSs. Restricting the selection of the MCS may include defining the partial subset of the MCSs based on the power ratios and assumed or pre-measured channel statistics of communication channels between the antenna array and the target receivers.

In an embodiment, restricting the selection of the MCS includes predefining multiple partial subsets of the MCSs corresponding to respective channel types between the antenna array and the target receivers, determining an actual channel type and selecting the predefined partial subset that corresponds to the actual channel type. In another embodiment, restricting the selection of the MCS includes including in the partial subset only the MCSs having at least a selected minimum data rate.

In a disclosed embodiment, calculating the at least one parameter includes setting a power ratio of a given jamming stream at a fixed value. In another embodiment, calculating the at least one parameter includes adapting the power ratios based on Channel State Information (CSI) of communication channels between the antenna array and the target receivers.

There is additionally provided, in accordance with an embodiment of the present invention, a communication apparatus including data generation circuitry, jamming generation circuitry and transmission circuitry. The data generation circuitry is configured to generate one or more data streams for transmission to respective target receivers. The jamming generation circuitry is configured to generate one or more jamming streams. The control unit is configured to calculate at least one parameter selected from a group of parameters consisting of power ratios for allocation to the jamming streams and Modulation and Coding Schemes (MCSs) for assigning to the data streams, based on a criterion that is set to reduce a probability of the data streams being decoded by at least one eavesdropping receiver. The transmission circuitry is configured to transmit the data streams and the jamming streams using an antenna array while applying the at least one parameter.

There is also provided, in accordance with an embodiment of the present invention, a method for communication. The method includes generating a data transmission including multiple successive parts in respective time intervals, for transmission to a target receiver. At least one jamming transmission is generated, having a configuration that varies over the respective time intervals corresponding to the parts of the data transmission, including at least first and second different configurations generated during respective first and second time intervals. The data transmission is transmitted to the target receiver using an antenna array, and the at least one jamming transmission is transmitted simultaneously using the antenna array.

In an embodiment, generating the jamming transmission includes generating a first number of jamming streams during the first time interval, and a second number of the jamming streams, different from the first number, during the second time interval. In another embodiment, generating the jamming transmission includes beamforming the jamming transmission using a first beamforming vector during the first time interval, and beamforming the jamming transmission using a second beamforming vector, different from the first beamforming vector, during the second time interval.

In yet another embodiment, generating the jamming transmission includes inhibiting the jamming transmission during the first time interval, and enabling the jamming transmission during the second time interval. In still another embodiment, generating the jamming transmission includes producing the jamming transmission at a first power level during the first time interval, and producing the jamming transmission at a second power level, different from the first power level, during the second time interval.

In a disclosed embodiment, generating the data transmission includes generating a communication packet, the first time interval includes one or more fields other than a payload of the packet, and the second time interval includes the payload of the packet. In some embodiments, the first and second time intervals occur in respective different first and second communication frames, and the method includes applying in the target receiver a first receive beamforming vector during the first time interval and a second receive beamforming vector, different from the first receive beamforming vector, during the second time interval, so as to cause the configuration of the jamming transmission to vary over the respective time intervals.

There is further provided, in accordance with an embodiment of the present invention, a communication apparatus including data generation circuitry, jamming generation circuitry and transmission circuitry. The data generation circuitry is configured to generate a data transmission including multiple successive parts in respective time intervals, for transmission to a target receiver. The jamming generation circuitry is configured to generate at least one jamming transmission having a configuration that varies over the respective time intervals corresponding to the parts of the data transmission, including at least first and second different configurations generated during respective first and second time intervals. the transmission circuitry is configured to transmit the data transmission to the target receiver using an antenna array, and to simultaneously transmit the at least one jamming transmission using the antenna array.

There is additionally provided, in accordance with an embodiment of the present invention, a method for communication. The method includes generating, for transmission from multiple transmit antennas, one or more data streams for transmission to respective target receivers and one or more jamming streams. Respective beamforming vectors are calculated for the jamming streams by applying QR factorization to a conjugate of an aggregate matrix of communication channels between the transmit antennas and receive antennas of all the target receivers, to produce a Q matrix; extracting a subset of columns of the Q matrix to serve as a basis for a vector subspace that is orthogonal to the aggregate matrix of the communication channels; and calculating the beamforming vectors for the jamming streams from the basis. The jamming streams are beam-formed using the calculated beamforming vectors. The data streams are transmitted to the target receivers using the multiple transmit antennas, and the jamming streams are simultaneously transmitted using the multiple transmit antennas.

In some embodiments, extracting the subset of the columns includes extracting last $N-N_U$ columns of the Q matrix, N denoting a total number of the transmit antennas, and $N_U$ denoting a total number of the receive antennas of all the target receivers. In an embodiment, the aggregate matrix of communication channels is replaced by a matrix obtained from one or more Singular Value Decompositions (SVD) of matrices of the communication channels, which are produced by the target receivers.

There is also provided, in accordance with an embodiment of the present invention, a communication apparatus including data generation circuitry, jamming generation circuitry and a control unit. The data generation circuitry is configured to generate one or more data streams for transmission to respective target receivers from multiple transmit antennas. The jamming generation circuitry is configured to generate one or more jamming streams. The control unit is configured to calculate respective beamforming vectors for the jamming streams by applying QR factorization to a conjugate of an aggregate matrix of communication channels between the transmit antennas and receive antennas of all the target receivers to produce a Q matrix, extracting a subset of columns of the Q matrix to serve as a basis for a vector subspace that is orthogonal to the aggregate matrix of the communication channels, and calculating the beamforming vectors for the jamming streams from the basis. The transmission circuitry is configured to beam-form the jamming streams using the calculated beamforming vectors, to transmit the data streams to the target receivers using the multiple transmit antennas, and to simultaneously transmit the jamming streams using the multiple transmit antennas.

There is further provided, in accordance with an embodiment of the present invention, a method for communication. The method includes receiving uplink signals from one or more communication stations. Responses of downlink communication channels to the communication stations are estimated based on the received uplink signals. One or more data streams for transmission using an antenna array to the communication stations and one or more jamming streams for transmission using the antenna array are configured based on the estimated downlink communication channels. The configured data streams and jamming streams are transmitted.

In some embodiments, the method includes instructing the communication stations to transmit training signals that provide channel information relating to communication channels to all receive antennas of the communication stations. In some embodiments, the method includes instructing a communication station to disable one or more receive chains in the communication station.

There is additionally provided, in accordance with an embodiment of the present invention, a communication apparatus including a control unit and transmission circuitry. The control unit is configured to estimate, based on uplink signals that are received from one or more communication stations, responses of downlink communication channels to the communication stations, and to configure, based on the estimated downlink communication channels, one or more data streams for transmission using an antenna array to the communication stations and one or more jamming streams for transmission using the antenna array. The transmission circuitry is configured to transmit the data streams and jamming streams.

There is further provided, in accordance with an embodiment of the present invention, a method for communication in a transmitter that transmits one or more data streams to respective target receivers and one or more jamming streams for preventing the data streams from being decoded by eavesdropping receivers. The method includes holding a definition of at least first and second transmission modes having respective, different first and second levels of security in preventing the data streams from being decoded by the eavesdropping receivers. One of the first and second transmission modes is selected for transmitting a data stream to a target receiver, by evaluating a selection criterion. The data stream and the jamming streams are transmitted via an antenna array using the selected transmission mode.

In some embodiments, transmitting the data stream using the first transmission mode includes transmitting at least one jamming stream simultaneously with the data stream, and transmitting the data stream using the second transmission mode includes transmitting the data stream while inhibiting transmission of the jamming streams. In some embodiments, selecting the transmission mode includes selecting a data rate for the data stream using a first rule, and transmitting the data stream using the second transmission mode includes selecting the data rate using a second rule, different from the first rule.

In an embodiment, transmitting the data stream using the first transmission mode includes transmitting channel sounding signals at first time intervals, and transmitting the data stream using the second transmission mode includes transmitting the channel sounding signals at second time intervals, more frequent than the first intervals. In another embodiment, selecting the transmission mode includes instructing the target receiver to respond to sounding requests prior to association with any transmitter while operating in the first transmission mode, and to respond to sounding requests only after the association while operating in the second transmission mode.

In yet another embodiment, evaluating the selection criterion includes choosing between the first and second transmission mode depending on a Service Set ID (SSID) with which the target receiver is associated. In still another embodiment, transmitting the data stream using the first transmission mode includes transmitting a jamming stream during a first subset of frames of the data stream, and transmitting the data stream using the second transmission mode includes transmitting the jamming stream during a second subset of the frames of the data stream, different from the first subset. In an embodiment, selecting the transmission mode includes receiving a request from the target receiver to select the one of the first and second transmission modes, and choosing the transmission mode in response to the request.

In a disclosed embodiment, selecting the transmission mode includes instructing the target receiver to disable one or more receive chains in the target receiver when operating in the first transmission mode, and to enable the one or more receive chains when operating in the second transmission mode. In another embodiment, selecting the transmission mode includes instructing the target receiver to transmit, when operating in the first transmission mode, channel feedback that is indicative of all receive antennas of the target receiver.

In yet another embodiment, selecting the transmission mode includes extracting from the data stream a tag that indicates a requested transmission mode, and selecting the transmission mode responsively to the tag. In still another embodiment, selecting the transmission mode includes detecting an exchange of Request-To-Send/Clear-To-Send (RTS/CTS) messages that precedes the data stream, from which an identity of a target receiver intended to receive the data stream is recognizable, and initiating the transmission mode based on the detected RTS/CTS messages.

There is further provided, in accordance with an embodiment of the present invention, a communication apparatus including transmission circuitry and a control unit. The transmission circuitry is configured to transmit data streams to target receivers and jamming streams for preventing the data streams from being decoded by eavesdropping receivers. the a control unit is configured to hold a definition of at least first and second transmission modes having respective, different first and second levels of security in preventing the data streams from being decoded by the eavesdropping receivers, to select one of the first and second transmission modes for transmitting a data stream to a target receiver by evaluating a selection criterion, and to control the transmission circuitry to transmit the data stream and the jamming streams via an antenna array using the selected transmission mode.

The present invention will be more fully understood from the following detailed description of the embodiments thereof, taken together with the drawings in which:

DETAILED DESCRIPTION OF EMBODIMENTS

Overview

Figure 1:
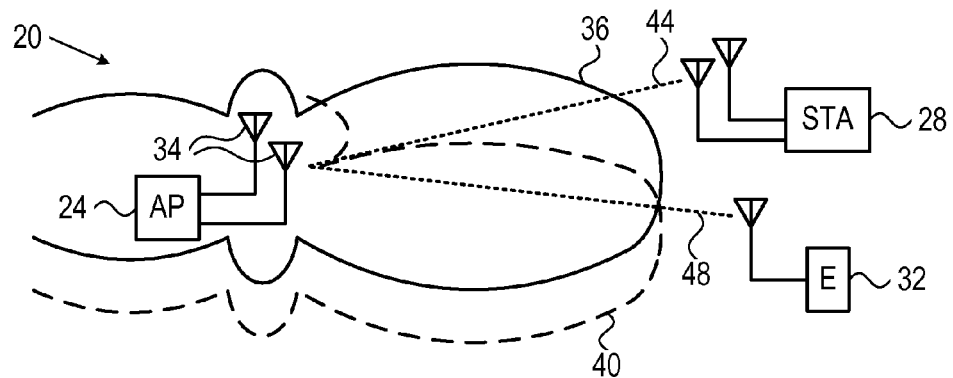
FIG. 1 is a block diagram that schematically illustrates a wireless communication system that uses physical-layer security, in accordance with an embodiment of the present invention.

Embodiments of the present invention that are described herein provide improved methods and systems for physical-layer security. The disclosed techniques are used in a communication system in which one or more transmitters transmit data streams to legitimate receivers, e.g., using beamforming, and apply means for protecting the data streams from being decoded by at least one eavesdropping receivers. The embodiments described herein refer to beamformed data streams that are transmitted to the legitimate receivers, but the disclosed techniques are also applicable in schemes that transmit the data streams to the legitimate receivers without beamforming.

In order to protect against eavesdropping, the transmitters transmit one or more jamming streams, which are beamformed so as to degrade the reception quality of the data streams at an eavesdropping receiver with little or no degradation at the legitimate receivers. Typically, no assumptions are made as to the location or properties of the eavesdropping receiver. The jamming streams may be transmitted by the same transmitter that transmits the data streams, or by a separate device referred to as a sentinel.

Some disclosed embodiments provide techniques for adaptively selecting the fraction of transmit power allocated to the jamming streams, and/or the Modulation and Coding Scheme (MCS) to be used for transmitting the data stream, so as to maintain optimal security. Other disclosed embodiments use different jamming stream configurations, e.g., modify the number of jamming streams or their beamforming vectors, for different parts of the data stream. Other disclosed techniques compute the beamforming vectors for the jamming streams by performing QR factorization of the aggregate channel matrix between the transmitter antennas and all legitimate receiver antennas.

In some embodiments, the transmitters configure the data streams and jamming streams based on implicit channel feedback. In these schemes, the transmitters assume that the uplink and downlink channels are reciprocal, and estimate the channels from uplink signals transmitted by the legitimate receivers. These schemes provide a high degree of security, relative to schemes in which the receivers send to the transmitters channel feedback that can be intercepted and exploited by the eavesdropping receiver.

In other disclosed embodiments, the transmitters choose between multiple transmission modes that provide different levels of security in preventing decoding of data streams by eavesdropping receivers. Several example transmission modes and selection criteria are described herein. Mode selection may be decided by the transmitters or by the legitimate receivers. In some embodiments, the receivers are configured differently in each transmission mode.

The methods and systems described herein improve the effectiveness of physical-layer security. At the same time, the disclosed techniques reduce the performance degradation and communication overhead that is associated with transmission of jamming streams.

System Description

FIG. 1 is a block diagram that schematically illustrates a wireless communication system 20 that uses physical-layer security, in accordance with an embodiment of the present invention. In the present example, system 20 comprises a Wireless Local Area Network (WLAN) that operates in accordance with IEEE Standard 802.11n, entitled "IEEE Standard for Information Technology—Telecommunications and Information Exchange between Systems—Local and Metropolitan Area Networks—Specific Requirements; Part 11: Wireless LAN Medium Access Control (MAC) and Physical Layer (PHY) Specifications; Amendment 5: Enhancements for Higher Throughput," October, 2009, which is incorporated herein by reference. In alternative embodiments, however, system 20 may operate in accordance with any other suitable communication standard or protocol.

System 20 comprises an Access Point (AP) 24, which communicates with one or more stations (STA) 28. System 20 applies PHY-level security techniques, which are described in detail below, to prevent transmissions of AP 24 from being illegitimately decoded by an eavesdropping receiver 32. Receiver 32 is referred to herein as "eavesdropper" for brevity. The figure shows a single AP, a single STA and a single eavesdropper for the sake of clarity. Real-life systems, however, typically comprise multiple APs 24 and multiple STAs 28, and may be subject to eavesdropping by multiple eavesdroppers 32. STAs 28, to which the data streams are addressed by the AP, are also referred to as legitimate STAs, legitimate receivers or target receivers.

AP 24 comprises multiple antennas 34. Antennas 34 are sometimes referred to as a beamforming array, although the beamforming operation is typically performed on the signals that are provided to the antennas. The AP typically transmits one or more beam-formed data transmissions, referred to as data streams, on directional transmission beams that are directed toward the STAs intended to receive the data streams.

In order to transmit a data stream to a given STA, the AP generates the signal to be transmitted, and transmits the signal simultaneously via multiple antennas 34 while applying a respective (complex) weight to each antenna. The set of weights, referred to as a beamforming vector, is selected so as to produce a directional beam that is directed toward the given STA. In the present example, AP 24 transmits a data stream to STA 28 using a beamforming vector that produces a beam 36.

In many practical scenarios, as in the example of FIG. 1, eavesdropper 32 is positioned at a location that enables it to receive beam 36 with sufficient Signal to Noise Ratio (SNR) so as to decode the data stream successfully. In order to secure the data stream, AP 24 uses the array of antennas 34 to transmit an additional beam-formed stream, referred to as a jamming stream. The jamming stream is transmitted with appropriate power and beamforming vector, which are set so as to (i) degrade the SNR at which eavesdropper 32 receives the data stream, and (ii) cause little or no SNR degradation at STA 28.

In the present context, the terms "jamming stream" and "jamming transmission" are used to describe any transmission that is not intended to convey useful data to any receiver, but rather to degrade the reception quality (e.g., SNR) at potential eavesdropping receivers. The terms SNR and Signal to Interference and Noise Ratio—SINR—are used interchangeably unless noted otherwise. Both terms refer to the power ratio between the data stream in question and the remaining signal and noise components, e.g., other data streams, jamming streams, and noise.

In the present example, the jamming stream is transmitted on a beam 40. As can be seen in the figure, the beamforming vector used for the jamming stream causes a spatial null in a direction 44 from AP 24 to STA 28, meaning that STA 28 will receive the jamming stream at a low power level that will cause little or no degradation to the decoding of the data stream carried on beam 36. Eavesdropper 32, on the other hand, is located at a direction 48 from the AP. Therefore, the eavesdropper will receive the jamming stream (beam 40) at a relatively high power level, which is comparable with that of the data stream (beam 36). As a result, the SNR of the data stream at eavesdropper 32 is poor, and there is high likelihood that the eavesdropper will fail to decode it.

In some embodiments, the jamming stream comprises a random or pseudorandom, noise-like signal. In other embodiments, the jamming stream comprises a sequence of modulated symbols that are selected at random from some symbol constellation, e.g., the same constellation used for modulating the data streams. In other embodiments, the jamming stream comprises a sequence of modulated symbols that are selected from a symbol constellation by Forward Error Correction Code (FEC) encoding and modulation of random bits. Further alternatively, the jamming stream may comprise any other suitable signal type.

Figure 3:
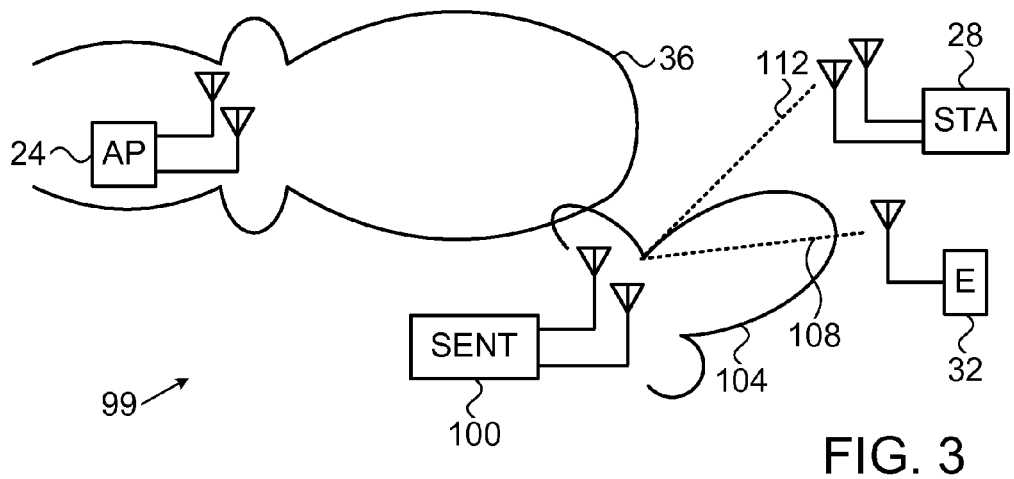
FIG. 3 is a block diagram that schematically illustrates a wireless communication system that uses physical-layer security, in accordance with an alternative embodiment of the present invention.

FIG. 1 shows only a single data stream and a single jamming stream, for the sake of clarity. In alternative embodiments, AP 24 may transmit any desired number of data streams and any desired number of jamming streams simultaneously. Further alternatively, the jamming streams may be transmitted by a transmitter other than AP 24. An embodiment of this sort is shown in FIG. 3 further below. Additional aspects of secure transmission schemes using jamming streams are addressed in U.S. Pat. Nos. 7,672,400 and 7,751,353, cited above.

Figure 2:
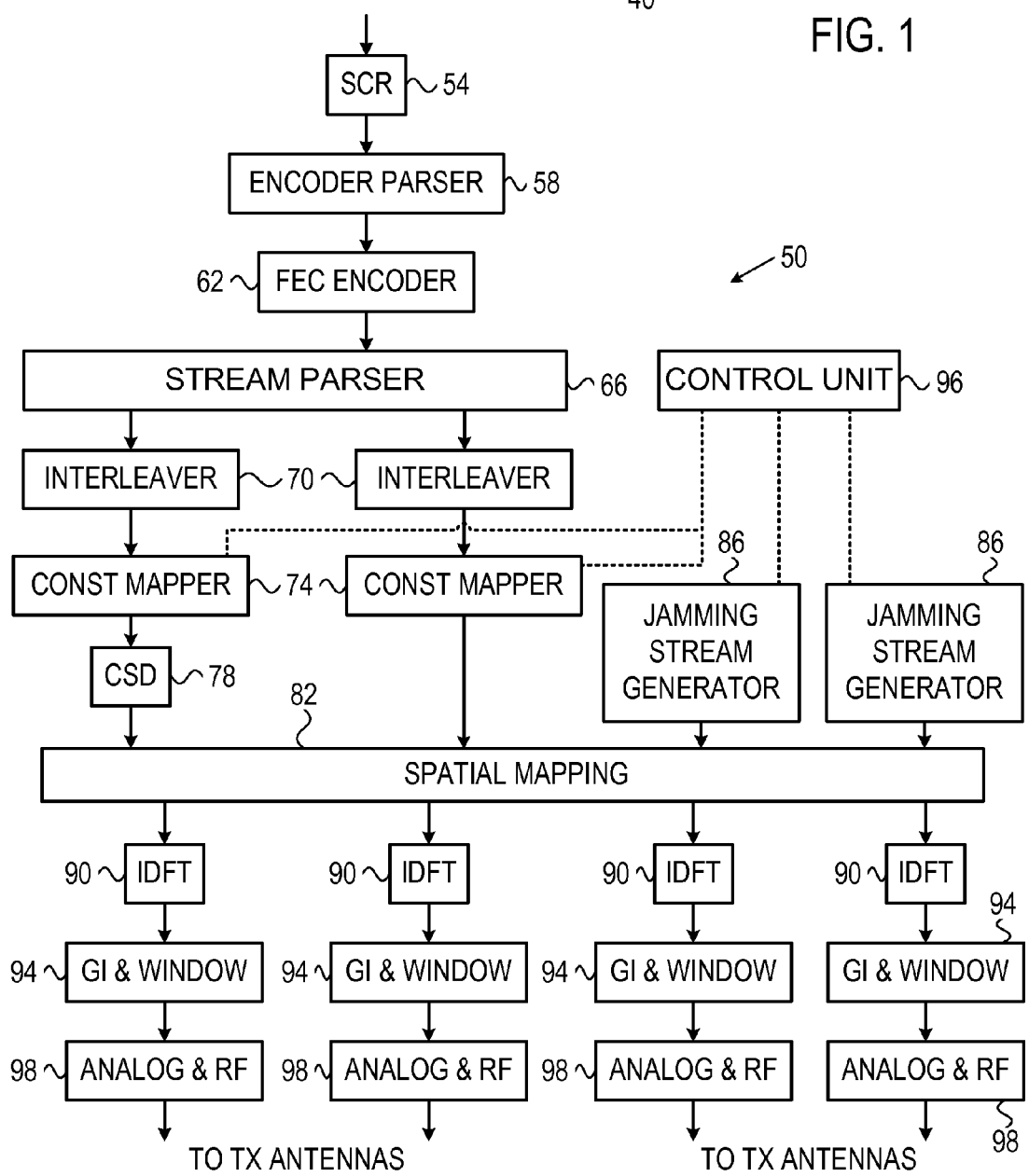
FIG. 2 is a block diagram that schematically illustrates a transmitter of a wireless Access Point (AP), in accordance with an embodiment of the present invention.

FIG. 2 is a block diagram that schematically illustrates a transmitter 50 of AP 24, in accordance with an embodiment of the present invention. Transmitter 50 generates a total of four streams—Two data streams and two jamming streams. In the present example, data for transmission is scrambled by a scrambler 54. An encoder parser 58 parses the scrambled data into blocks, and each block is encoded with a FEC by a FEC encoder 62.

A stream parser 66 parses the encoded data into two data streams. Each data stream is interleaved by a respective interleaver 70, and each interleaved data stream is mapped onto a sequence of modulated symbols by a respective constellation mapper 74. In the present example, a Cyclic Shift Diversity (CSD) module 78 applies CSD to a given data stream, i.e., spreads the signal with different cyclic shifts across multiple streams. A spatial mapping unit 82 maps each data stream onto the multiple antennas while applying the appropriate beamforming vector to the data stream. In the present example transmitter 50 comprises four transmit antennas.

In the embodiment of FIG. 2, transmitter 50 comprises two jamming stream generators 86, which generate two respective jamming streams. Spatial mapping unit 82 applies suitable beamforming vectors to the jamming streams, in a similar manner to the mapping of the data streams. Thus, unit 82 produces four outputs corresponding to four transmit antennas. Each output of unit 82 comprises a stream of samples made-up of weighted components of each of the two data streams and each of the two jamming streams, in accordance with the beamforming vectors set for the streams.

Each output of unit 82 is processed by a respective Inverse Discrete Fourier Transform (IDFT) module 90 that applies IDFT to the sample stream. A respective Guard Interval (GI) and Windowing module 94 inserts a GI into the sample stream and filters the stream with a suitable window function. A respective analog&RF module 98 converts the sample stream into an analog signal, up-converts the analog signal to RF, amplifies the RF signal and transmits the RF signal via the respective transmit antenna.

In the example of FIG. 2, the data streams comprise Orthogonal Frequency Division Multiplex (OFDM) signals that are multiplexed in the frequency domain. Note that, even in an OFDM-based system, addition of the jamming streams may alternatively be performed in the time domain. In such implementation, the coefficients of each beamforming vector of each interfering stream are, in general, Infinite Impulse Response (IIR) filters (i.e., complex rational functions in one variable D) instead of plain complex numbers.

In the embodiment of FIG. 2, transmitter 50 comprises a control unit 96, which configures transmission parameters of the data streams and/or jamming streams, using techniques that are described below. For example, unit 96 may set parameters such as the fractions of transmit power to be allocated to the jamming streams, the Modulation and Coding Schemes (MCSs) to be assigned to the data streams, and/or any other suitable transmission parameter.

In some of the embodiments described below, jamming stream generators 86 are referred to a jamming generation circuitry that generates the jamming streams, elements 54-78 are referred to as data generation circuitry that generates the data streams, and the remaining elements of transmitter 50 are referred to as transmission circuitry that transmits the data streams and the jamming streams.

FIG. 3 is a block diagram that schematically illustrates a wireless communication system 99 that uses physical-layer security, in accordance with an alternative embodiment of the present invention. In system 99, unlike system 20 of FIG. 1 above, the jamming streams are produced by a sentinel transmitter 100—A unit that is separate from AP 24. In the example of FIG. 3, sentinel 100 transmits a jamming stream on a beam 104. The beamforming vector selected by sentinel device 100 causes beam 104 to be directed in a direction 108 of eavesdropper 32, and to have a spatial null in a direction 112 of STA 28. Additional aspects of sentinel 100 are addressed in U.S. Pat. No. 7,751,353, cited above.

In this embodiment, the functionality of control unit 96 may be embodied in sentinel 100, in AP 24 or it may be partitioned between the AP and the sentinel in any suitable way.

Generally, the number of legitimate STAs 28 is denoted K (typically K=1, but not necessarily). Each legitimate STA may comprise a single receive antenna or multiple receive antennas. AP 24 and/or sentinel device 100 produces and transmits one or more data streams and one or more jamming streams so that the legitimate STAs are able to decode the data streams but eavesdropper 32 is unable to decode them, with high likelihood. Although the description that follows refers to jamming streams transmitted by AP 24, for the sake of clarity, at least some of the disclosed techniques are similarly applicable to jamming streams transmitted by sentinel device 100.

Let N denote the number of transmit antennas of AP 24, and let $n_k$ denote the number of receive antennas of the $k^{th}$ legitimate STA ($k \in \{1, \ldots, K\}$). The total number of receive antennas of all legitimate STAs is denoted $N_U = \Sigma_{k=1}^{K} n_k$. In a typical application, although not necessarily, $N_U < N$. The number of jamming streams is denoted $N_D$, where typically $N_D \leq N - N_U$.

Typically although not necessarily, AP 24 selects the beamforming vectors applied to the jamming streams to be (at least approximately) orthogonal to the rows of the channel matrix between AP 24 and all receive antennas of all legitimate STAs. (Alternatively, the beamforming vectors applied to the jamming streams are chosen to be approximately orthogonal to the rows of the effective channel matrix, which considers the channels after receive-side beamforming in the legitimate STAs. In the present context, the terms "communication channel" and "channel matrix" refer to either the physical channel or to the effective channel, as appropriate.)

Formally—Let $H_k \in C^{n_k \times N}$ denote the channel matrix between the AP and the $k^{th}$ legitimate STA, and let $H_U = (H_1^T | \ldots | H_K^T)^T \in C^{N_U \times N}$ denote the overall channel matrix between the AP and all the legitimate STAs, wherein $(\ )^T$ denotes matrix transposition. The beamforming matrix $B_D \in C^{N \times N_D}$ of the jamming streams is typically constrained to satisfy the condition $H_U B_D \approx 0$. Note, however, that generally the disclosed techniques are in no way limited to jamming streams whose beamforming vectors are orthogonal to the physical or effective channels of the data streams.

The system and transmitter configurations shown in FIGS. 1-3 are example configurations, which are chosen purely for the sake of conceptual clarity. In alternative embodiments, any other suitable system or transmitter configuration can also be used. Some system or transmitter elements may be implemented in hardware, e.g., in one or more Application-Specific Integrated Circuits (ASICs) or Field-Programmable Gate Arrays (FPGAs). Additionally or alternatively, some system or transmitter elements can be implemented using software, or using a combination of hardware and software elements.

Some of the functions of the AP or the sentinel device, e.g., the functions of control unit 96, may be carried out using a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Power Fraction and MCS Selection

In some embodiments, control unit 96 in AP 24 controls the SNRs at which the data streams are received by legitimate STAs 28 and affects the SNRs at which the data streams are received by eavesdropper 32, by controlling the power fraction allocated to the jamming streams, and/or the Modulation and Coding Scheme (MCS) assigned to the data streams. The adaptation of the power fraction and/or MCS is performed based on some criterion that is set to reduce the probability of the data streams being decoded by eavesdropper 32, while enabling successful decoding of the data streams by the legitimate target STAs.

In the following description, $\alpha \in (0,1)$ denotes the fraction of the overall transmit power P (summed over all the data streams and the jamming streams) that is allocated to the jamming streams. Generally, increasing α improves the level of security at the expense of reduced signal strength at the legitimate STAs, and vice versa.

In some embodiments, AP 24 transmits each data stream using a certain MCS that is selected from a set of possible MCSs. Each MCS defines a respective combination of modulation and FEC code, and therefore a respective data rate. In the present context, the term "higher MCS" means an MCS having a higher data rate (and hence higher order modulation, higher coding rate and/or higher number of data streams). Similarly, the term "lower MCS" means an MCS having a lower data rate (and hence lower order modulation, lower coding rate and/or smaller number of data streams). For a given decoding performance (e.g., error rate or error probability), higher MCSs typically require higher SNR, and vice versa.

In some embodiments, AP 24 sets the power fraction α at some fixed value, e.g., α=0.5, and restricts the MCS used for transmitting a data stream to a particular legitimate STA to a partial subset of the possible MCSs. In accordance with an example criterion, the AP defines the partial subset of MCSs such that, given α, the eavesdropper is expected with high probability to fail in decoding the data stream. Typically, the partial subset of MCSs is defined as the MCSs whose data rate is above a certain value (or whose index is above some minimum index, assuming the MCSs are numbered with indices that correspond to the respective data rates). This criterion restricts the choice of MCSs to those that require at least a certain SNR. With proper restriction of the MCSs, security is assured with high probability for any user that can support at least the lowest MCS in the allowed subset.

Consider, for example, K=1, i.e., a single data stream transmitted to a single legitimate STA. Since α is known, the power fraction left for the data stream is known, and the level of interference caused by the jamming stream to the legitimate STA (e.g., ≅0) is also known. This information is typically sufficient for finding the highest MCS that will still enable successful decoding by the legitimate STA. In some embodiments, AP 24 chooses the MCS for the data stream in question to be below this highest MCS, as long as the chosen MCS is in the partial subset described above. If the highest MCS is not in the partial subset, then the AP can in some embodiments declare that secure transmission is not possible for the legitimate STA and avoids transmission until the STA has channel conditions allowing the use of some MCS in the allowed subset.

AP 24 may define the partial subset of MCSs for a given data stream, e.g., set the minimum allowed MCS index, in any suitable way. In an example embodiment, AP 24 has no information on the channel to the eavesdropper. In this example the AP regards the channel to the eavesdropper as random, drawn according to some statistical distribution depending on the propagation channel. Consequently, the SNR (denoted γ) of the data stream at the eavesdropper is also random, and the statistics of γ are determined by α.

Each single-stream MCS is associated with a respective threshold SNR denoted $\gamma_{TH}^{MCS}$, such that if $\gamma \geq \gamma_{TH}^{MCS}$, the error rate (e.g., Packet Error Rate—PER) at the eavesdropper is below the minimum PER that is considered adequate for security. In an embodiment, AP 24 restricts the choice of MCS for a given data stream to the partial subset of MCSs for which γ is likely to be below $\gamma_{TH}^{MCS}$. The AP may assume a certain channel model for this purpose, and set the Cumulative Distribution Function (CDF) of γ for this channel model. (The CDF of γ is typically calculated off-line using some assumed or measured channel model, e.g., by an external computer, and provided to the AP.) The AP may find the minimum MCS index $i_0$ for which the probability of having $\gamma \geq \gamma_{TH}^{MCS}$ is sufficiently low, e.g., below some probability threshold. The AP then defines the partial subset of MCSs as the MCSs whose indices are $i_0$ or higher (higher indices correspond to higher MCS, and vice versa, in accordance with the definition above).

In alternative embodiments, AP 24 may define the partial subset of MCSs (e.g., define $i_0$) in any other suitable manner, not necessarily assuming any channel model or SNR calculation. For example, the minimum MCS index may be found in advance, e.g., using laboratory experimentation. An example laboratory experiment may include an AP and a user STA placed in a typical environment, and a potential eavesdropper that is moved between different locations in this environment. The AP transmits to the user STA using various MCSs. In each eavesdropper location, the maximum MCS decodable by the eavesdropper is recorded. The experiment can be repeated for different AP and STA locations.

In another embodiment, an ad-hoc minimum MCS index is defined. For example, if the application using the data stream is likely to require some minimum MCS index $i_1$ for proper operation (e.g., the application may request a desired throughput at a certain Quality-of-Service grade corresponding to $i_1$), AP 24 may use this MCS index and set $i_0 \equiv i_1$.

As yet another example, if it is known in advance that the channel from the AP to the legitimate STAs at any point in time is one of several possible propagation channel types, then it is possible to prepare several values of $i_0$ in advance, one for each channel type. During operation, AP 24 may assess the current channel and choose the $i_0$ value corresponding to the current channel type. The AP may assess the channel based on, for example, the learned channel matrix or a function of the matrix, measured or assumed SNR, PER or any other suitable measure of the channel.

Figure 4:
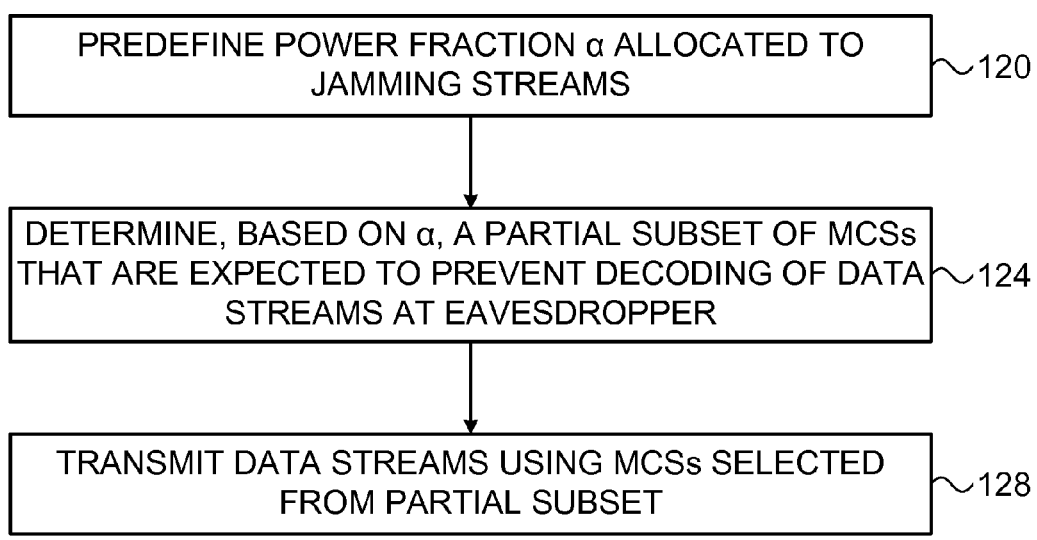
FIGS. 4-10 are flow charts that schematically illustrate methods for physical-layer security, in accordance with embodiments of the present invention.

FIG. 4 is a flow chart that schematically illustrates a method for physical-layer security, in accordance with an embodiment of the present invention. The method begins with AP 24 defining a power fraction α of the total transmitted power P that is allocated to jamming streams, at a power ratio definition step 120.

AP 24 defines, based on α, a partial subset of the possible MCSs for transmitting the data streams to its intended legitimate STA, at a subset definition step 124. The partial subset of MCSs is defined so as to include only MCSs that are expected to be un-decodable by the eavesdropper. The AP may define the partial subset of MCSs using the methods described above, for example. The AP transmits the jamming streams using the power fraction α, and the data streams using an MCS selected from the respective partial subset of MCSs.

In some embodiments, unit 96 in AP 24 modifies the power fraction α allocated to the jamming streams based on the channel type between the AP and the legitimate STAs. In accordance with an example criterion, based on the Channel State Information (CSI) for the channels between the AP and the legitimate STAs, AP 24 chooses α such that (i) the SNR at eavesdropper 32 will prevent successful decoding of the data streams with high probability but (ii) the SNR at the legitimate STA will enable successful decoding.

Figure 5:
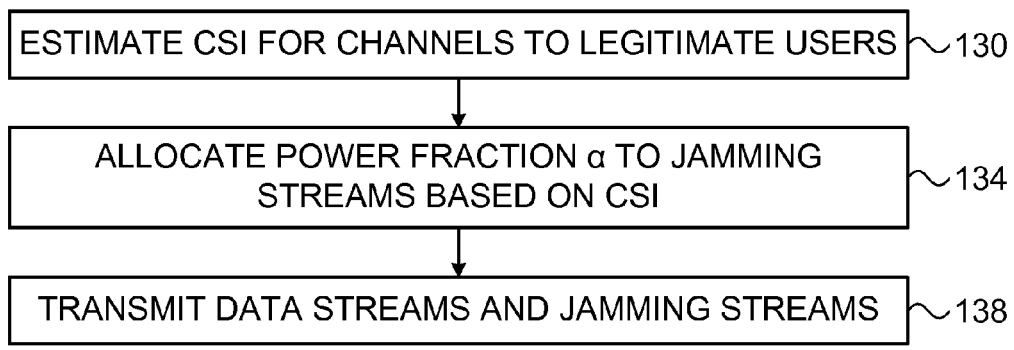

FIG. 5 is a flow chart that schematically illustrates a method for physical-layer security, in accordance with an embodiment of the present invention. The method begins with AP 24 estimating the CSI for the channels to the legitimate STAs, at a CSI estimation step 130. The AP allocates the power fraction α for the jamming streams based on the estimated CSI, at an α allocation step 134. The AP transmits the data streams and the jamming streams at the respective power levels according to the allocated α, at a transmission step 138.

In some embodiments, AP 24 chooses α based on the SINR that the data streams would have, if they were allocated all the transmit power P (that is, if α were set to zero). Consider, for example, the case of a single legitimate STA (i.e., K=1) and a single data stream. Based on the assumed model of the propagation channel from AP 24 to this STA, the AP may store the CDF of $\gamma=\gamma(\alpha)$ for several values of $\alpha$ and in memory. (Typically, the CDFs are calculated off-line, e.g., by an external computer, and provided to the AP.) During operation, the AP can use its knowledge of the actual channel towards the legitimate STA to calculate $g(0)$, the SNR (this time assuming no interference from the jamming stream) at the legitimate STA, assuming $\alpha=0$.

Assume, in this example, that the beamforming vectors of the jamming streams are orthogonal to the channel of the legitimate STA, so that the STA is not subject to interference. In this case, the SINR at the legitimate STA for $\alpha>0$, denoted $g(\alpha)$, is equal to the SNR and is given by $(1-\alpha) \cdot g(0)$. Based on the stored CDFs of $\gamma(\alpha)$, AP 24 may find the CDFs of $\gamma(\alpha)/g(\alpha)$, e.g., by a simple re-scaling of the x-axis.

Then, the AP may choose the value of $\alpha$ for which $\gamma(\alpha)/g(\alpha)$ is below some threshold t with a sufficiently high probability p (e.g., p=0.95). The threshold t is typically set small enough to ensure that $\gamma(\alpha)$ is too low for successful decoding of the highest-rate MCS selected based on $g(\alpha)$. For example, for the set of MCSs defined in the IEEE 802.11n standard, cited above, t may be set between approximately −5 dB and −3 dB (these numbers are approximately the largest threshold difference between two consecutive MCSs), i.e., between approximately 0.3 and 0.5 in linear units.

The example above makes an implicit assumption that the rate selection scheme for the legitimate STA attempts to select the MCS having the highest possible rate. After $\alpha$ is fixed, AP 24 may find a concrete value for $g(\alpha)$, and consequently choose a rate for the legitimate STA. Note that in the current example, where $\alpha$ is chosen dynamically based on the SINR of the data streams, there is typically no limitation on the minimum allowed MCS.

In summary, the above-described example process of setting $\alpha$ and MCS, which is carried out by AP 24 based on the estimated CSI, comprises the following steps:

Offline:
  Find and store the CDFs of the $\alpha$-dependent SINR of the data streams at the eavesdropper side, $\gamma(\alpha)$, for several values of the power fraction $\alpha$ allocated to the jamming streams.
  Choose the desired SINR threshold t, and the desired probability p for the SINR to be below t.
During Operation:
  Find $g(0)$, the interference-free SNR at the legitimate STA assuming $\alpha=0$, for example based on the known channel towards the legitimate STA.
  Using the stored CDFs of $\gamma(\alpha)$, find $\alpha_0$, the lowest value of $\alpha$ for which the probability that $\gamma(\alpha) \leq t \cdot (1-\alpha) \cdot g(0)$ is at least p. Set $\alpha$ to be equal to $\alpha_0$.
  After choosing $\alpha$, the SNR $\gamma(\alpha)$ at the legitimate STA is known to be $\alpha \cdot g(0)$. Choose the highest-rate MCS for which the data stream is decodable at this known SNR.

After carrying out these steps, AP 24 may begin transmission of the data stream and jamming stream.

The example above refers to a single data stream, for the sake of clarity. In alternative embodiments, this technique can be generalized in a straightforward manner to multiple data streams. In cases where several data streams are transmitted, one effective SNR is typically used for representing them. Effective SNR may be used in various scenarios that involve multiple data streams, such as for a multi-stream MCS. In such cases, a histogram of an effective $\gamma$ can be used instead of a histogram of $\gamma$. Effective SNRs that can be used for this purpose are described, for example, by Tsai and Song, in "Effective-SNR Mapping for Modeling Frame Error Rates in Multiple-State Channels," 3GPP2-C30-20030429-010, Apr. 29, 2003, which is incorporated herein by reference.

Modifying Jamming Streams During Transmission

In some embodiments, AP 24 modifies the jamming stream configuration during a given data transmission that is transmitted on a data stream. (The description that follows refers to AP 24 for the sake of clarity. In alternative embodiments, the disclosed techniques may be carried out by sentinel 100.)

For example, a given data transmission (e.g., packet) may comprise multiple successive parts that are transmitted in respective time intervals. The AP may set the (one or more) jamming streams to different configurations during different parts of the data transmission. This feature provides an additional degree of trade-off between security and data throughput for the legitimate STA.

In an example embodiment, a packet comprises a synchronization sequence, a training sequence used for channel estimation, a part that defines the signal parameters (e.g., MCS) and a payload that carries the packet data. Packets in IEEE 802.11n and IEEE 802.11ac systems, for example, comprise training sequences that are referred to as Short training Fields (STFs) and Long Training Fields (LTFs). The packet part that defines the signal parameters is referred to as a SIGNAL field in IEEE 802.11n and IEEE 802.11ac systems. Generally, however, a packet or other data transmission may comprise any suitable number of parts of any suitable kind.

AP 24 may modify any suitable characteristic of the jamming streams from one part of the data transmission to another, and any such modification is regarded herein as a different jamming stream configuration. For example, the AP may modify the number of jamming streams that are transmitted during different parts of the data transmission. In particular, the AP may switch off the jamming streams during one or more parts of the data transmission, and switch on one or more jamming streams during one or more other parts.

When the data transmission comprises a communication packet, for example, the AP may transmit one jamming stream configuration during the packet payload, and another jamming stream configuration during packet parts other than the payload.

For IEEE 802.11n or IEEE 802.11ac packets, for example, the AP may transmit jamming streams only during the packet payload transmission, only during transmission of the payload and training sequence, or only during transmission of the payload, the training sequence and the synchronization sequence. In another example, the AP may transmit jamming streams only during the payload and the packet part used for indicating the signal parameters. Further alternatively, the AP may apply jamming selectively during any other suitable subset of the packet parts.

In alternative embodiments, the AP transmits different numbers of jamming streams during different respective parts of the data transmission. Additionally or alternatively, the AP steers the jamming streams using different beamforming vectors during different respective parts of the data transmission.

Consider, for example, an IEEE 802.11n or IEEE 802.11ac embodiment in which the beamforming vectors of the jamming streams are selected to cause substantially no interference at the legitimate STAs. In this embodiment, the AP may configure the jamming streams differently during LTF transmission and during payload transmission. During LTFs, the STAs typically do not yet have sufficient information for performing receive-side beamforming. Therefore, the jamming stream beamforming vectors should be orthogonal to the channels of all receive antennas of all legitimate STAs. During payload transmission, on the other hand, the STAs typically apply receive-side beamforming, and the jamming stream beamforming vectors may be orthogonal only to the effective, post-receive-side beamforming channels.

Since the number of data streams transmitted to a legitimate STA is typically smaller than the number of STA receive antennas, the relaxed constraint of being orthogonal only to the effective channels enables a larger number of jamming streams during payload transmission, and therefore increased security.

In the embodiments described above, AP 24 modifies the number of jamming streams and/or the beamforming vectors of the jamming streams for different parts of the data transmission. In alternative embodiments, the AP may modify any other suitable configuration of the jamming streams.

For example, the power of the jamming streams (or the ratio α defined above) may be set to different values during different parts of a transmission (e.g., packet). In accordance with the IEEE 802.11n/ac standard, the SIGNAL field should be transmitted at the lowest possible MCS of the standard. Consequently, the SIGNAL field may be more susceptible to eavesdropping. Thus, in some embodiments, the jamming stream power (or the value of α) is increased during the SIGNAL filed.

Figure 6:
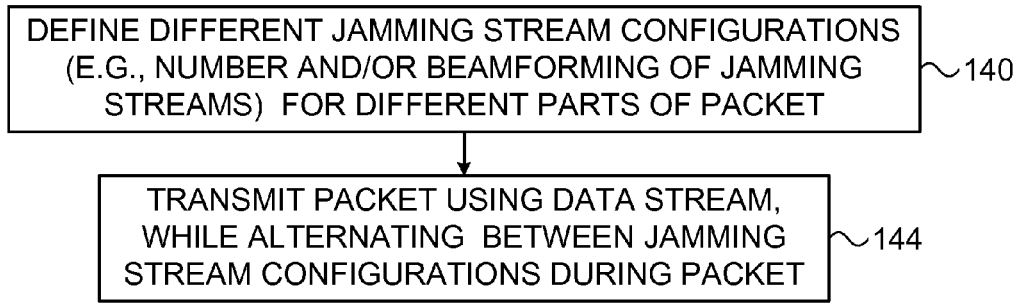

FIG. 6 is a flow chart that schematically illustrates a method for physical-layer security, in accordance with an embodiment of the present invention. The method begins with AP 24 defining different jamming stream configuration for different respective packet parts, at a definition step 140. The AP transmits a valuable data packet using one or more streams, and simultaneously transmits one or more jamming streams, at a stream transmission step 144. In transmitting the jamming streams, the AP alternates between the jamming stream configurations defined for the respective packet parts.

Since in some embodiments security is achieved by using jamming beamforming vectors that are only constrained to be orthogonal to the effective channel of the legitimate receivers, there may exist eavesdropper locations for which the jamming streams are received at lower power than the data streams. At these locations, if the channel is static (i.e., changes slowly over time) the eavesdropper may be able to decode the data streams constantly.

To overcome this problem, in some embodiments a legitimate receiver deliberately changes its RX beamforming vectors over time in order to force variations in the effective channel. While this method may somewhat degrade the achievable data rate of the legitimate receiver, it introduces a significant enhancement in security. Consider, for example, the transmission of a single data stream to a single multiple-antenna legitimate receiver. The legitimate receiver may switch between RX beamforming to the strongest and the second strongest eigenmode, and the jamming beamforming vectors will change accordingly, following the changes in the effective single-RX antenna channel. The AP may be informed of the effective channel by explicit feedback from the legitimate receiver, which reports on the effective channel (including the RX beamforming) instead of the physical channel.

Beamforming Vector Computation

The description that follows provides an example technique for calculating the beamforming vectors for the jamming streams. In the disclosed embodiments, control unit 96 of AP 24 (or sentinel 100) applies this scheme under the assumption that the jamming stream beamforming vectors are to cause zero interference to the legitimate STAs. In other words, as noted above, the beamforming vectors of the jamming streams are constrained to be orthogonal to the rows of $H_U$.

In order to calculate the beamforming vectors of the jamming streams, unit 96 of AP 24 calculates an orthonormal basis for the vector subspace $ker(H_U)=\{x|H_U x=0\}$, a subspace that is orthogonal to the aggregate channel matrix $H_U$. (For the sake of clarity, the description refers to jamming stream beamforming vectors that are orthogonal to the physical channels of the legitimate STA antennas. The disclosed technique can be used in a similar manner to calculate jamming stream beamforming vectors that are orthogonal to the effective channels following receive-side beamforming at the STAs.)

In one embodiment, AP 24 finds the orthonormal basis using LQ factorization of $H_U$. In such a process $H_U$ is written as $H_U=L \cdot Q$, wherein Q is a unitary matrix $Q \in C^{N \times N}$, and L is a lower-triangular matrix $L \in C^{N_U \times N}$. Assuming that $H_U$ is of full rank, the conjugate transpose of the last $N-N_U$ rows of Q may serve as the desired orthonormal basis.

Alternatively, AP 24 may produce the LQ factorization of $H_U$ by QR factorization of $H_U^*$. In this process, $H_U^*$ is written as $H_U^*=Q \cdot R$, yielding $H_U=R^* \cdot Q^*$. The AP produces the desired basis for $ker(H_U)$ by taking the last $N-N_U$ columns of matrix Q in the QR factorization of $H_U^*$. AP 24 may perform the QR factorization using any suitable method. Examples of known methods that can be used for this purpose comprise the Householder method and the Givens rotations.

In some embodiments, for all k, the k-th legitimate STA 28 performs a Singular Value Decomposition (SVD) of its channel matrix $H_k$ to obtain $H_k=U_k \cdot D_k \cdot V_k^*$ (with $U_k, D_k \in C^{n_k \times n_k}$ and $V_k^* \in C^{n_k \times N}$, where ( )* denotes matrix conjugation and transposition), $U_k$ and $V_k$ have orthonormal columns, and $D_k$ is diagonal), and sends the AP only $V_k$. If $H_k$ is full rank for all k (i.e., no zeros on the main diagonals of all matrices $D_k$), then $$ker(H_U) = ker \begin{pmatrix} U_1 D_1 V_1^* \\ U_2 D_2 V_2^* \\ \vdots \\ U_K D_K V_K^* \end{pmatrix} = ker \begin{pmatrix} V_1^* \\ V_2^* \\ \vdots \\ V_K^* \end{pmatrix}$$

Therefore, in embodiments where all $V_k$ are available instead of $H_U$, the AP may derive the orthonormal basis using the above method from $(V_1|V_2|\ldots|V_K)^*$ instead of from $H_U$.

Figure 7:
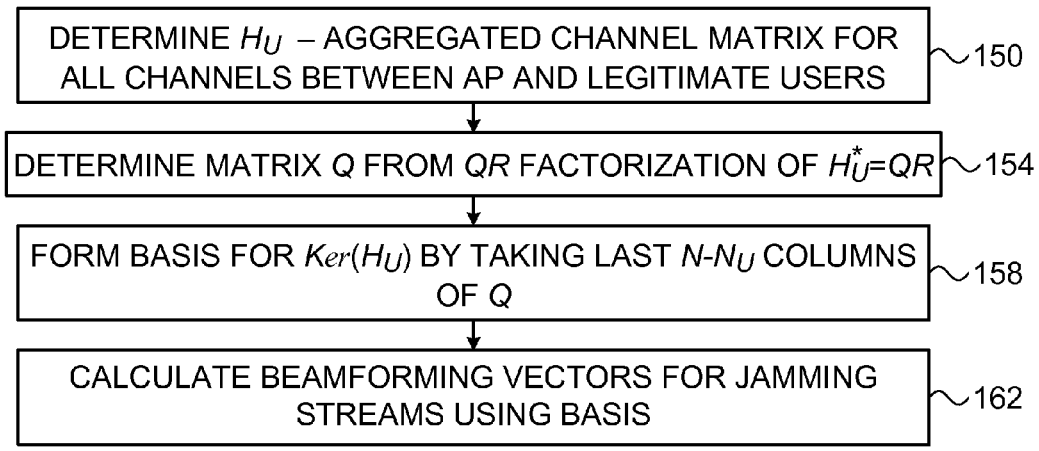

FIG. 7 is a flow chart that schematically illustrates a method for calculating jamming stream beamforming vectors, in accordance with an embodiment of the present invention. The method begins with AP 24 determining the aggregated channel matrix $H_U$, at a channel estimation step 150. The AP then determines the matrix Q of the QR factorization $H_U^*=Q \cdot R$, at a Q determination step 154.

AP 24 forms an orthonormal basis for $ker(H_U)$ by taking the last $N-N_U$ rows of Q, at a basis formation step 158. The AP then calculates the beamforming vectors for the jamming streams using the orthonormal basis, at a jamming vector calculation step 162. Typically, the AP will use the maximum possible number of jamming streams (that is, $N-N_U$ jamming streams). In general, however, the number $N_d$ of jamming streams may be smaller than $N-N_U$, and so in some cases the AP will only have to calculate less than $N-N_U$ beamforming vectors for the jamming streams.

Physical-Layer Security Using Implicit Channel Feedback

In the embodiments described above, AP 24 configures the parameters of the data streams and jamming streams (e.g., power levels, beamforming vectors, number of jamming streams and activation times for jamming streams) based on the estimated communication channels between the AP and the legitimate STAs. The AP typically receives from the legitimate STAs explicit feedback (e.g., CSI) regarding the channels from the AP, and uses the explicit feedback for configuring the data and jamming streams. In IEEE 802.11n systems, for example, the explicit feedback may comprise the actual channel matrices as measured by the STAs.

In some scenarios, however, the explicit feedback transmitted by the STAs may be used by eavesdropping receiver 32 to mitigate the physical-layer security techniques described herein. For example, the eavesdropper may intercept the explicit feedback transmissions from the STAs, reconstruct the aggregate channel matrix $H_U$, and use the reconstructed channel matrix to cancel the effect of the jamming streams.

In some embodiments, control unit 96 in AP 24 assumes that the channels between the AP and the legitimate STAs are reciprocal, i.e., that the channel from a given AP antenna to a given STA antenna is substantially the same as (or is otherwise indicative of) the channel in the opposite direction. Under this assumption, the AP can receive uplink signals (e.g., sounding frames carrying training signals) from the legitimate STAs, and learn the downlink channel responses from the received uplink signals. This form of channel estimation is referred to as implicit feedback.

When system 20 uses implicit feedback, no channel feedback is transmitted over the air. Thus, eavesdropper 32 can only obtain the channel responses from the legitimate STAs to the eavesdropper (which are usually of no value) and not the channel responses between the AP and the STAs. AP 24 may implement any of the physical-layer security described herein using implicit feedback.

Figure 8:
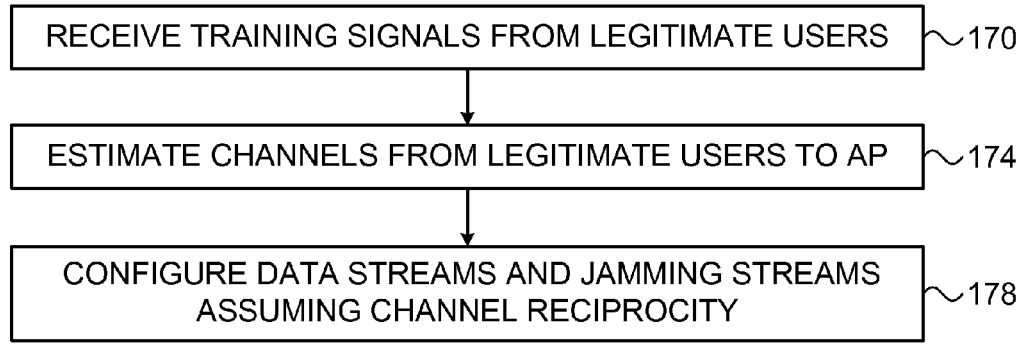

FIG. 8 is a flow chart that schematically illustrates a method for physical-layer security using implicit feedback, in accordance with an embodiment of the present invention. The method begins with AP 24 receiving training signals over the uplink from legitimate STAs 28, at an uplink reception step 170. AP 24 estimates the downlink channel responses, from the AP to the legitimate STAs, based on the training signals received over the uplink, at a channel estimation step 174.

The AP configures one or more data streams and/or one or more jamming streams based on the estimated downlink channel responses, at a stream configuration step 178. Any suitable parameter of the data streams and/or jamming streams may be configured based on the implicit feedback, such as power levels, beamforming vectors, number of jamming streams and activation times for jamming streams in accordance with the methods described above.

In some embodiments, when using implicit feedback, AP 24 instructs the legitimate STAs to transmit sufficient uplink signals that enable the AP to learn the full channel matrices between the STAs and the AP. In other words, AP 24 instructs the legitimate STAs to transmit training signals that provide channel information relating to all receive antennas of the legitimate STAs. For example, the AP may instruct the legitimate STAs to transmit training signals via all their antennas.

In some embodiments, AP 24 instructs a legitimate STA 28 to disable one or more of its reception chains (i.e., one or more receive antennas and associated receiver or processing circuitry) when using the physical-layer security schemes described herein with implicit feedback. This feature is useful in a number of scenarios.

For example, in some embodiments the legitimate STA comprises more receive chains (and respective receive antennas) than transmit chains (and respective transmit antennas). In such a case, even if the STA transmits uplink training signals via all the transmit antennas, the AP will not be able to deduce the full downlink channel matrix from these signals. Disabling one or more of the receive chains in the STA (e.g., leaving only those receive chains that have corresponding transmit chains) enables the system to overcome this limitation. As another example, disabling one or more of the STA receive chains will typically increase the maximum possible number of jamming streams, thereby increasing the possible security level.

Selective Application of Secure Transmission

In some embodiments, control unit 96 holds a definition of two or more transmission modes having different levels of physical-layer security, i.e., different levels of preventing eavesdropping receivers from decoding data streams. Unit 96 selects the appropriate transmission mode for transmitting a given data stream by evaluating a certain selection criterion. Several example criteria are described further below.

This sort of multi-mode operation enables the system to offer varying levels of physical-layer security to different STAs. Moreover, this technique improves the system performance, since it reduces the communication overhead and performance degradation that is associated with transmission of the jamming streams.

In some embodiments, the transmission modes comprise a secure mode and a normal mode. In the secure mode the AP (or sentinel) transmits the data stream simultaneously with one or more jamming streams, using any of the methods described herein. In the normal mode, the data stream is transmitted without jamming streams.

In some embodiments, the transmission configuration of the data stream differs between the normal and secure modes. In one embodiment, unit 96 selects the MCS (and thus the data rate) for the data stream using different rules in the two modes. Generally, higher-rate MCSs provide a higher degree of security, since they require a higher SNR at the eavesdropping receiver for successful decoding. Thus, in some embodiments, unit 96 applies a more aggressive MCS selection rule in the secure mode, in comparison with the normal mode.

Consider, for example, a rule that selects the MCS such that the Packet Error Rate (PER) is below some maximum allowed threshold t. In this embodiment, unit 96 may set t to a higher value in the secure mode and to a lower value in the normal mode. This setting enables higher security in the secure mode, at the possible expense of poorer reception at the legitimate STA.

In alternative embodiments, unit 96 causes the AP (or sentinel) to transmit channel sounding signals more frequently in the secure mode, in comparison with the normal mode. Typically, the AP selects beamforming vectors for the jamming streams based on channel feedback from the legitimate STAs. The STAs typically learn the channel by performing measurements on channel sounding signals that they receive from the AP.

Therefore, transmitting channel sounding signals more frequently increases the accuracy of the jamming stream beamforming vectors, especially when the channel varies over time. In an embodiment, the AP transmits channel sounding signals more frequently in the secure mode, in order to maintain the accuracy of the jamming stream beamforming.

In some embodiments, unit 96 selects the appropriate transmission mode depending on the Serving Set ID (SSID) with which the legitimate STA is associated. In these embodiments, the AP supports operation in multiple SSIDs. The AP associates each legitimate STA with one of the supported SSIDs, and transmits to each legitimate STA using a transmission mode that corresponds to this SSID. This technique enables the AP to provide varying levels of physical-layer security to different STAs.

In some embodiments, transmissions in one SSID are performed in a secure mode, i.e., with jamming streams, while transmission in another SSID is performed without any jamming streams. In other embodiments, in one SSID one subset of the frames (e.g., all the frames) are protected by jamming streams, while in another SSID a different subset of the frames is protected by jamming streams.

In some embodiments, the AP associates one or more STAs that require high-level physical-layer security with a given SSID, and protects all frames (including multicast and broadcast frames) in this SSID with jamming streams. In other SSIDs the multicast and broadcast frames are not protected. This technique enables the AP to prevent even legitimate STAs outside the given SSID from decoding the data streams addressed to the STAs in this SSID.

In various embodiments, transmission mode selection may be initiated by the AP or sentinel (or management application that control either of them), or by the STA. In some embodiments, frames that are to be protected by jamming streams are tagged, and the AP transmits jamming streams selectively—to protect only the tagged frames.

Figure 9:
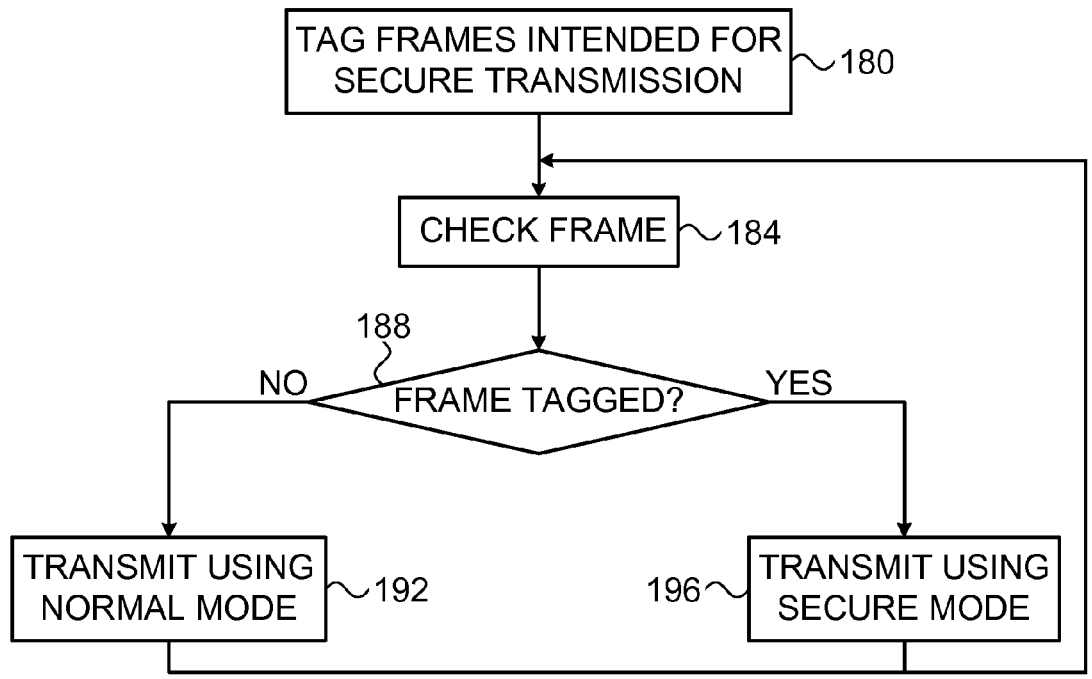

FIG. 9 is a flow chart that schematically illustrates a method for physical-layer security, in accordance with an embodiment of the present invention. The method begins with tagging frames that are intended for secure transmission, at a tagging step 180. Tagging of this sort can be performed, for example, by the AP, by a management application or by any other suitable entity.

When preparing to transmit a certain frame in a data stream, unit 96 in the AP checks whether the frame is tagged, at a frame checking step 184. If the frame is not tagged, as checked at a checking step 188, the AP transmits the frame using the normal transmission mode, at a normal transmission step 192. If, on the other hand, step 188 indicates that the frame is tagged, the AP transmits the frame using the secure transmission mode, at a secure transmission step 196. The method then loops back to step 184 above for processing the next frame.

In yet another embodiment, tagging of frames may depend on the Access Category (AC) mechanism of the IEEE 802.11n/ac standard (or a similar mechanism in other standards). For example, packets with the highest AC may be considered as tagged. In an alternative embodiment, the MCS subset for security, as well as the jamming stream power fraction, $\alpha$, may depend on the AC, thus providing different levels of security for different ACs.

In some embodiments, the legitimate STA sends signaling requests to the AP, requesting to protect particular data streams or frames. These requests may signal the AP to start or stop transmission of jamming streams, or they may use any other suitable protocol. This mechanism enables an end-user application in the STA to select between secure and normal transmissions, e.g., in order to protect sensitive transactions.

Selective STA Configuration During Secure and Normal Transmission

As noted above, in order to apply effective physical-layer security, AP 24 should have complete channel information to all STA antennas. In various scenarios, it may not be possible for the AP to obtain complete CSI:

The AP performs single-user explicit beamforming channel sounding for the full dimensions of the channel (number of STA antennas), as defined in the IEEE 802.11n and IEEE 802.11ac standards, but the STA decides to return only a subset of the channel matrix.

The STA has more receive antennas than the number of supported spatial streams. For example, 2T3R STA (with two transmit antennas and three receive antennas) supporting 2SS (two spatial streams). In this case, in the IEEE 802.11n standard, the AP can sound only for a maximum dimension equal to the number of supported spatial streams. Moreover, the AP is typically unaware of the existence of the extra receive antennas.

The STA has more receive antennas than transmit antennas, and the AP uses implicit beamforming for estimating the channel for physical-layer security.

The STA uses an antenna selection/switching scheme in which different antennas are used for reception and transmission, and the AP uses implicit beamforming.

In some embodiments, the last three scenarios can be mitigated by instructing the STA to use the same set of antennas for transmission and reception when communicating in the secure transmission mode. For example, in the 2T3R STA that supports 2SS, the third receive antenna can be disabled in the secure transmission mode. The disabling operation may be controlled by either the AP or the STA upon entering the secure transmission mode. When the disabling is controlled by the AP, a protocol is typically defined between the AP and the STA for controlling this feature in the STA. In some embodiments, the first scenario above can be mitigated by forcing the STA to return its full channel matrix. The control over this option can be performed by the STA or by the AP.

These STA control functions above are applicable to systems in which physical-layer security is performed by an AP (e.g., FIG. 1) or by a sentinel device (e.g., FIG. 3). When using a sentinel device, the STA may be forced to reply to the sounding requests of the sentinel device. In another embodiment, the sentinel device may impersonate the AP and send the sounding request as if it is transmitted from the AP, e.g., using the proper SSID and data encryption for the STA. In these embodiments the STA would treat the channel sounding request as if it is transmitted by the AP and would therefore reply. In these implementations, the sentinel may be coordinated with the AP, e.g., receive the AP parameters to enable it to impersonate the AP.

Another scenario in which non-standard STA configuration in the secure transmission mode is useful is when the AP or sentinel needs to employ explicit beamforming, but the STA has not yet enabled its explicit sounding feedback mechanism. One such scenario occurs in the IEEE 802.11n/ac standards, when the STA has not associated to the AP. In this case, a conventional STA may not respond to sounding requests, and so to enable physical-layer security, the STA must be configured to support sounding even before association. It should be noted that pre-association transactions are typically not encrypted, and therefore there is particular value in employing physical-layer security methods at this stage.

Figure 10:
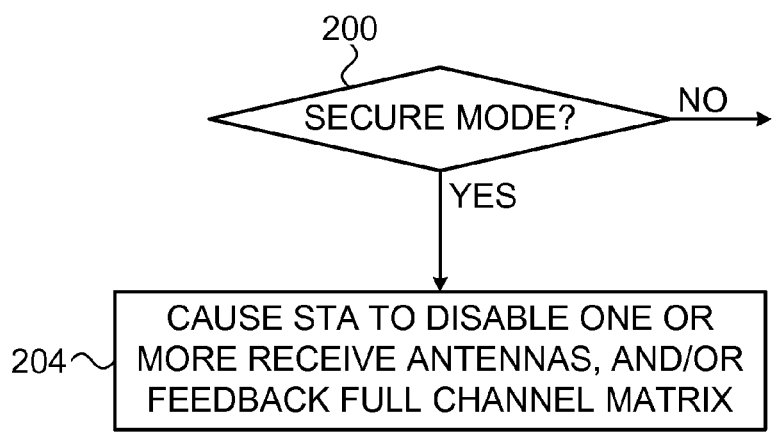

FIG. 10 is a flow chart that schematically illustrates a method for physical-layer security, in accordance with an embodiment of the present invention. The method begins with the AP or STA checking whether transmission is conducted using the secure or normal transmission mode, at a mode checking step 200. If transmission is conducted using the secure transmission mode, the STA is forced to disable one or more of its receive antennas (and associated receive chain), and/or to feedback its full channel matrix, at a STA configuration step 204. Otherwise, the STA configuration is skipped.

Selective Triggering of Sentinel Device

In some embodiments, sentinel device 100 of FIG. 3 attempts to intercept data transmissions that should be protected with one or more jamming streams. One possible way to identify a data transmission is to decode the receiver and/or sender address in the Medium Access Control (MAC) header of the frame. In this mode of operation (aspects of which are described, for example, in U.S. Pat. No. 7,751,353, cited above) the sentinel decodes the MAC addresses in the header. When the sentinel identifies an address that should be secured, it switches from reception to transmission and starts transmitting one or more jamming streams that are orthogonal to the destination of the frames.

This approach, however, is sub-optimal, for example since the MAC header is not protected by CRC and may therefore be unreliable. Moreover, the jamming streams protect only the data portion of the frame and not the preamble (since the preamble precedes the MAC header). It can be shown that physical-layer security is enhanced when parts of the preamble are also protected by the jamming streams.

In some embodiments, sentinel 100 identifies the frames to be protected by detecting the exchange of Request-To-Send/Clear-To-Send (RTS/CTS) messages that precedes the frames in question, from which the identity of the target STA intended to receive the data stream is recognizable. The sentinel can then provide security to all frames (downlink or uplink) that are exchanged during the transaction (TXOP) in which the detected RTS/CTS took place. In these embodiments, the sentinel can transmit the jamming streams starting from the preamble, since it has no need to intercept the address in the MAC header of each frame.

In an alternative embodiment, the sender of the frames can be coordinated with the sentinel and notify it in advance that certain frames should be protected (e.g. the frames that immediately follow the notification). The coordination can be done over the air or using any other suitable means.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for communication, comprising:
   generating a data transmission comprising multiple successive parts in respective time intervals, for transmission to a target receiver;
   generating at least one jamming transmission having a configuration that varies over the respective time intervals corresponding to the parts of the data transmission, including at least first and second different configurations generated during respective first and second time intervals, by beamforming the jamming transmission using a first beamforming vector during the first time interval, and beamforming the jamming transmission using a second beamforming vector, different from the first beamforming vector, during the second time interval; and
   transmitting the data transmission to the target receiver using an antenna array, and simultaneously transmitting the at least one jamming transmission using the antenna array.

2. The method according to claim 1, wherein generating the jamming transmission comprises generating a first number of jamming streams during the first time interval, and a second number of the jamming streams, different from the first number, during the second time interval.

3. The method according to claim 1, wherein generating the jamming transmission comprises inhibiting the jamming transmission during the first time interval, and enabling the jamming transmission during the second time interval.

4. A method for communication, comprising:
   generating a data transmission comprising multiple successive parts in respective time intervals, for transmission to a target receiver;
   generating at least one jamming transmission having a configuration that varies over the respective time intervals corresponding to the parts of the data transmission, including at least first and second different configurations generated during respective first and second time intervals, by producing the jamming transmission at a first power level during the first time interval, and producing the jamming transmission at a second power level, different from the first power level, during the second time interval; and
   transmitting the data transmission to the target receiver using an antenna array, and simultaneously transmitting the at least one jamming transmission using the antenna array.

5. The method according to claim 1, wherein generating the data transmission comprises generating a communication packet, wherein the first time interval comprises one or more fields other than a payload of the packet and wherein the second time interval comprises the payload of the packet.

6. A method for communication, comprising:
   generating a data transmission comprising multiple successive parts in respective time intervals, for transmission to a target receiver;
   generating at least one jamming transmission having a configuration that varies over the respective time intervals corresponding to the parts of the data transmission, including at least first and second different configurations generated during respective first and second time intervals; and
   transmitting the data transmission to the target receiver using an antenna array, and simultaneously transmitting the at least one jamming transmission using the antenna array,
   wherein the first and second time intervals occur in respective different first and second communication frames, and comprising applying in the target receiver a first receive beamforming vector during the first time interval and a second receive beamforming vector, different from the first receive beamforming vector, during the second time interval, so as to cause the configuration of the jamming transmission to vary over the respective time intervals.

7. A communication apparatus, comprising:
   data generation circuitry, which is configured to generate a data transmission comprising multiple successive parts in respective time intervals, for transmission to a target receiver;
   jamming generation circuitry, which is configured to generate at least one jamming transmission having a configuration that varies over the respective time intervals corresponding to the parts of the data transmission, including at least first and second different configurations generated during respective first and second time intervals, by beamforming the jamming transmission using a first beamforming vector during the first time interval, and beamforming the jamming transmission using a second beamforming vector, different from the first beamforming vector, during the second time interval; and transmission circuitry, which is configured to transmit the data transmission to the target receiver using an antenna array, and simultaneously transmitting the at least one jamming transmission using the antenna array.

8. The apparatus according to claim 7, wherein the jamming generation circuitry is configured to generate a first number of jamming streams during the first time interval, and a second number of the jamming streams, different from the first number, during the second time interval.

9. The apparatus according to claim 7, wherein the jamming generation circuitry is configured to inhibit the jamming transmission during the first time interval, and to enable the jamming transmission during the second time interval.

10. A communication apparatus, comprising:
data generation circuitry, which is configured to generate a data transmission comprising multiple successive parts in respective time intervals, for transmission to a target receiver;
jamming generation circuitry, which is configured to generate at least one jamming transmission having a configuration that varies over the respective time intervals corresponding to the parts of the data transmission, including at least first and second different configurations generated during respective first and second time intervals, by generating the jamming transmission at a first power level during the first time interval, and generating the jamming transmission at a second power level, different from the first power level, during the second time interval; and
transmission circuitry, which is configured to transmit the data transmission to the target receiver using an antenna array, and simultaneously transmitting the at least one jamming transmission using the antenna array.

11. The apparatus according to claim 7, wherein the data transmission comprises a communication packet, wherein the first time interval comprises one or more fields other than a payload of the packet and wherein the second time interval comprises the payload of the packet.

12. A communication apparatus, comprising:
data generation circuitry, which is configured to generate a data transmission comprising multiple successive parts in respective time intervals, for transmission to a target receiver;
jamming generation circuitry, which is configured to generate at least one jamming transmission having a configuration that varies over the respective time intervals corresponding to the parts of the data transmission, including at least first and second different configurations generated during respective first and second time intervals; and
transmission circuitry, which is configured to transmit the data transmission to the target receiver using an antenna array, and simultaneously transmitting the at least one jamming transmission using the antenna array,
wherein the first and second time intervals occur in respective different first and second communication frames, wherein the target receiver applies a first receive beamforming vector during the first time interval and a second receive beamforming vector, different from the first receive beamforming vector, during the second time interval, and wherein the jamming generation circuitry is configured to vary the configuration of the jamming transmission over the respective time intervals in response to the first and second receive beamforming vectors.

13. A method for communication, comprising:
instructing one or more communication stations to transmit uplink training signals that provide channel information relating to communication channels to all receive antennas of the communication stations;
receiving the uplink training signals from the communication stations;
estimating, based on the received uplink training signals, responses of downlink communication channels to the communication stations;
configuring, based on the estimated downlink communication channels, one or more data streams for transmission using an antenna array to the communication stations and one or more jamming streams for transmission using the antenna array; and
transmitting the configured data streams and jamming streams.

14. The method according to claim 13, and comprising instructing a communication station to disable one or more receive chains in the communication station.

15. A communication apparatus, comprising:
a control unit, which is configured to instruct one or more communication stations to transmit uplink training signals that provide channel information relating to communication channels to all receive antennas of the communication stations, to estimate, based on the uplink training signals that are received from the communication stations, responses of downlink communication channels to the communication stations, and to configure, based on the estimated downlink communication channels, one or more data streams for transmission using an antenna array to the communication stations and one or more jamming streams for transmission using the antenna array; and
transmission circuitry, which is configured to transmit the data streams and jamming streams.

16. The apparatus according to claim 15, wherein the control unit is configured to instruct a communication station to disable one or more receive chains in the communication station.

* * * * *